United States Patent [19]
Gaylord

[11] 3,787,974
[45] Jan. 29, 1974

[54] DENTURE HOLDING MEANS
[76] Inventor: John A. Gaylord, 12578 Nacido Ln., San Diego, Calif.
[22] Filed: Jan. 12, 1973
[21] Appl. No.: 323,282

[52] U.S. Cl. .................................................. 32/3
[51] Int. Cl. ........................................... A61c 13/24
[58] Field of Search ................................... 32/3, 4

[56] References Cited
UNITED STATES PATENTS

| | | | |
|---|---|---|---|
| 3,722,096 | 3/1973 | Kopfer et al. | 32/3 |
| 3,555,683 | 1/1971 | Gregorovic et al. | 32/3 |
| 2,752,680 | 7/1956 | Winnberg | 32/3 |
| 2,510,184 | 6/1950 | Lynn | 32/3 |

*Primary Examiner*—Louis G. Mancene
*Assistant Examiner*—J. Q. Lever
*Attorney, Agent, or Firm*—George B. White

[57] ABSTRACT
A unit molded into the denture which includes a casing forming a pumping chamber in the denture and being open toward the exposed side of the denture with conduits connecting two receptacles in a suction chamber or chambers which latter are open toward the gum side of the denture; a resilient pumping element in the pumping chamber is adapted to produce a suction in each receptacle; at each receptacle is an enlarged suction cavity and a suction head secured in the receptacle projects into the suction cavity and has holes in its sides communicating through the receptacle with the conduits, whereby when by suction the system is filled with a fluid, and then placed over the gum, some of the moisture is expelled by the pumping means which when released produces a predetermined suction to suck the gum into the cavity and around the suction head; The suction head is replaceable by a cavity forming element which has a suitable wire adapted to be extended through the form of the gum on which the denture is molded, thereby to assist in holding the unit in position during the molding, and also in forming the said cavity.

9 Claims, 8 Drawing Figures

PATENTED JAN 29 1974　　3,787,974

DENTURE HOLDING MEANS

BACKGROUND OF THE INVENTION

This application is an improvement over applicant's co-pending application for "Means to Hold Dentures in Place", Ser. No. 208,656, filed Dec. 16, 1971.

The improvement consists in forming a unit which can be easily secured in place over the cast representing the gum and facilitate the molding of the denture that fits on that gum and thereby accurately locates the various chambers or opening in the denture.

An object of the invention is to provide an assembled unit which is able to locate the respective cavities for creating the suction to hold the denture in place during the holding operation.

Another object of the invention is to provide a novel suction head in a cavity in such a manner that the gum can be drawn into the cavity and around the suction head.

DETAILED DESCRIPTION

Figure 1:
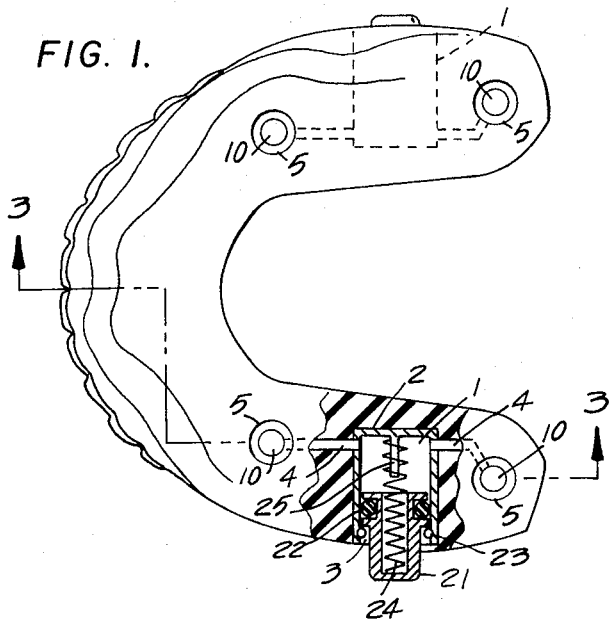
FIG. 1 is a plan view of the denture viewing from the concave or gum side partly broken away to illustrate the pumping means.
Figure 2:
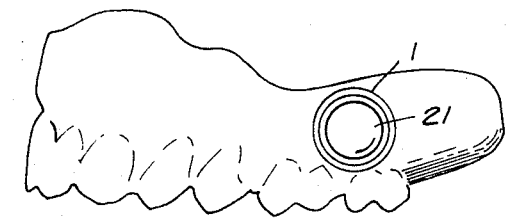
FIG. 2 is a side view of the denture.
Figure 3:
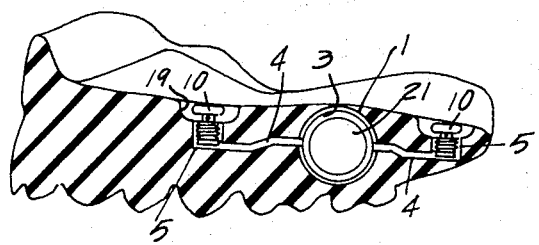
FIG. 3 is a sectional view of the denture, the section being taken on lines 3—3 of FIG. 1.
Figure 4:
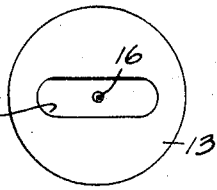
FIG. 4 is a plan view of a molding insert replaceable by the suction head.
Figure 5:
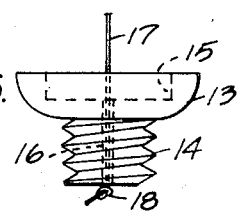
FIG. 5 is a side view of the molding insert.

The insert unit includes a cylindrical casing 1 having a bottom 2 and an open end 3. Near the bottom 2 of the casing 1 are a pair of tubes 4 which extend outwardly. On the end of each tube 4 is a receptacle 5 provided with internal threads 6. The threads 6 terminate spaced from the bottom 7 of the receptacle 5 so as to leave an air chamber 8 with which the adjacent tube 4 communicates.

Into the receptacle 5 is threaded a hollow stem 9 of a suction head 10. A reduced neck 11 formed under the suction head 10 has a plurality of suction holes 12.

Figure 6:
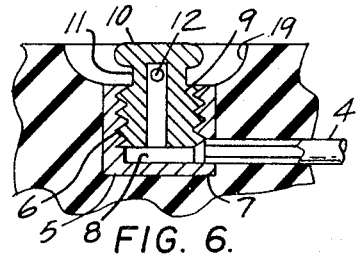
FIG. 6 is a fragmental sectional view showing one of the receptacles with the suction head in the adjacent cavity in the denture.
Figure 7:
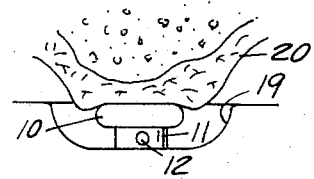
FIG. 7 is a fragmental view showing the initial engagement of the suction head with the gum.

When the denture is molded, the suction head 10 and its stem 9 are unscrewed from the receptacle 5 and a cavity mold 13 is secured in its place by the threaded stem 14 extended from the bottom of the cavity mold 13. The cavity mold has a transverse slot 15 to accommodate a screw driver for screwing and unscrewing operations. A hole 16 extends axially through the cavity mold 13 and the stem 14, and a comparatively thin wire 17 is extended through the hole 16 and has a knot 18 at the end of the stem 14. This wire is extended through the usual cast reproduction of the gum and it is so tied in place that it holds the assembly in position while the denture is molded. After the denture is molded and removed from the cast the cavity formed is unscrewed and removed and replaced by the stem 9 and suction head 10 heretofore described. Thus the suction head 10 is located in an enlarged cavity 19 as shown in FIG. 6 for the purpose of sucking the gum 20 from the position shown in FIG. 7 into the cavity as shown in FIG. 8.

For the purpose of producing suction there are pumping means provided in the casing 1. In the present illustration the open end 3 of the casing 1 is exposed to the side of the denture. A plunger 21 provided with a slideable sealing ring 22 is reciprocable in the casing 1. An O ring 23 near the open end 3 limits the outward stroke of the plunger 21. A spring 24 inside of the hollow plunger 21 bears against the bottom 2 of the casing 1 and is held on a guide pin 25 so as to normally urge the plunger 21 outwardly.

Figure 8:
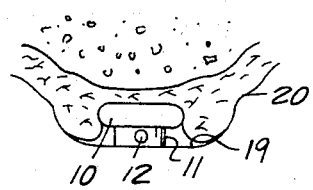
FIG. 8 is a fragmental view showing the gum sucked into the cavity and around the suction head.

In operation the user first immerses the denture into a suitable liquid and works the pump plunger 21 to fill the hollow stem 9, the tubes 4 and the casing 1 with the liquid, then places the denture on the gum and then pushes the plunger 21 in to expel liquid into the cavity 19, and then by releasing the plunger 21, the suction created thereby through the holes 12 draws the gum into the cavity 19 and around the suction head 10 as shown in FIG. 8.

I claim:

1. In a means to hold a denture on the gum in the mouth of a person,
    said denture having a concave side to extend over the gum and an opposite exposed side,
    at lease one pumping chamber in the exposed side of said denture,
    at least one suction recess in the concave side of said denture,
    a member projecting into said recess, and having suction apertures opening into said recess,
    connecting means in said denture between said pumping chamber and said apertures,
    and manipulatable pumping means in said pumping chamber for creating suction at said apertures thereby to draw the gum into said recess and around said projection.

2. The means to hold a denture in place specified in claim 1, and
    said projecting member being hollow,
    and an enlarged head on said projecting member spaced from the bottom of said recess and from said apertures.

3. The means to hold a denture in place specified in claim 1, and
    means to urge said pumping means into an initial sucking position, whereby said pumping means expels fluid from said chamber and through said apertures when moved from said initial position and sucks fluid into said chamber from said recess when returning to said initial position.

4. The means to hold a denture in place specified in claim 3, and
    said chamber being a casing open at its exposed end,
    a receptacle imbedded into said denture for holding said projecting member,
    and said connecting means being a tube communicating the chamber in said casing with said projection through said receptacle.

5. The means to hold a denture in place specified in claim 4, and
    said projecting member including,
    a hollow stem secured in said receptacle, and a head on top of said projection extending beyond the outer circumference of said hollow stem, the suction through said apertures drawing said gum into said recess around the periphery of said head.

6. In the means to hold a denture in place, a hollow pumping casing, at least one tube extended from said casing, a receptacle on the free end of the tube facing in opposite direction to said casing, said casing, said tube and said receptacle being adapted to be imbedded in a denture to form a suction pumping system, and a recess-forming die insertable in said receptacle being removable after the recess is formed in the denture.

7. The means specified in claim 6, and securing means extended from said die for securing said die together with the assembled receptacle, tube and casing to a cast model of the gum thereby to locate said casing and said receptacle in a predetermined position for said denture.

8. The means specified in claim 7, and a projecting member interchangeable with said die in said receptacle after said denture is formed around said assembled casing, tubing and receptacle.

9. The means specified in claim 8, and said projecting member including, a hollow stem adapted to be secured in said receptacle having lateral apertures through its side, and a circumferentially enlarged head on the stem adapted to be surrounded by the gum sucked into the recess formed by said die.

* * * * *